(12) United States Patent
Horiuchi et al.

(10) Patent No.: US 10,945,258 B2
(45) Date of Patent: Mar. 9, 2021

(54) TERMINAL AND COMMUNICATION METHOD WITH TWO STEP DOWNLINK CONTROL INFORMATION

(71) Applicant: Panasonic Intellectual Property Corporation of America, Torrance, CA (US)

(72) Inventors: Ayako Horiuchi, Kanagawa (JP); Hidetoshi Suzuki, Kanagawa (JP); Lilei Wang, Beijing (CN)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/471,855

(22) PCT Filed: Jan. 6, 2017

(86) PCT No.: PCT/CN2017/070378
§ 371 (c)(1),
(2) Date: Jun. 20, 2019

(87) PCT Pub. No.: WO2018/126429
PCT Pub. Date: Jul. 12, 2018

(65) Prior Publication Data
US 2020/0092856 A1    Mar. 19, 2020

(51) Int. Cl.
*H04W 72/04* (2009.01)
*H04L 1/00* (2006.01)
*H04L 1/18* (2006.01)

(52) U.S. Cl.
CPC ......... *H04W 72/042* (2013.01); *H04L 1/0004* (2013.01); *H04L 1/0038* (2013.01); *H04L 1/0072* (2013.01); *H04L 1/1861* (2013.01)

(58) Field of Classification Search
None
See application file for complete search history.

(56) References Cited

U.S. PATENT DOCUMENTS

| 2011/0164572 A1 | 7/2011 | Kim et al. |
| 2014/0133440 A1 | 5/2014 | Zhang et al. |

(Continued)

FOREIGN PATENT DOCUMENTS

| JP | 2014-529208 A | 10/2014 |
| JP | 2016-540408 A | 12/2016 |

OTHER PUBLICATIONS

3GPP TS 36.213 V13.3.0, "3rd Generation Partnership Project; Technical Specification Group Radio Access Network; Evolved Universal Terrestrial Radio Access (E-UTRA); Physical layer procedures (Release 13)," Sep. 2016, 385 pages.

(Continued)

*Primary Examiner* — Christine T Duong
(74) *Attorney, Agent, or Firm* — Seed IP Law Group LLP

(57) ABSTRACT

A terminal is disclosed, which is capable of appropriately determining a resource to which a DCI is mapped. A DCI receiver (203) receives first and second downlink (DL) control signals, and a signal demultiplexer (202) demultiplexes a DL data signal from a received signal, using the first and the second DL control signals. The DCI receiver (203) identifies a resource for the second DL control signal based on information on the first DL control signal, or information on the DL data signal, indicated by the first DL control signal.

8 Claims, 14 Drawing Sheets

(56) References Cited

U.S. PATENT DOCUMENTS

| | | | |
|---|---|---|---|
| 2015/0036645 A1* | 2/2015 | Shin | H04L 5/001 370/329 |
| 2015/0139290 A1* | 5/2015 | Currivan | H04L 25/022 375/224 |
| 2015/0263798 A1 | 9/2015 | Ko et al. | |
| 2016/0128028 A1 | 5/2016 | Mallik et al. | |
| 2016/0254878 A1 | 9/2016 | Wang et al. | |
| 2018/0242317 A1* | 8/2018 | Marinier | H04W 56/003 |
| 2019/0312679 A1* | 10/2019 | Jayasinghe | H03M 13/095 |

OTHER PUBLICATIONS

Huawei et al., "WF on two stage DCI design," R1-1613668, Agenda item: 7.1.4.1, 3GPP TSG RAN WG1 #87, Reno, Nov. 14-18, 2016, 3 pages.
International Search Report, dated Sep. 28, 2017, for corresponding International Application No. PCT/CN2017/070378, 2 pages.
NTT Docomo, "Revision of SI: Study on New Radio Access Technology," RP-161596 (revision of RP-161214), Agenda Item: 9.2.2, 3GPP TSG RAN Meeting #73, New Orleans, Sep. 19-22, 2016, 7 pages.
Extended European Search Report, dated Nov. 11, 2019, for European Application No. 17889578.5-1220, 12 pages.
Huawei, HiSilicon, "Discussion on sTTI scheduling schemes," R1-1613028, Agenda Item: 6.2.10.2.2, 3GPP TSG RAN WG1 Meeting #87, Reno, USA, Nov. 14-18, 2016, 8 pages.
Huawei, "Email discussion [86b-23] on multi-steps DL control channel design," R1-1611656, Agenda Item: 7.1.4.1, 3GPP TSG RAN WG1 Meeting #87, Reno, USA, Nov. 14-18, 2016, 14 pages.

* cited by examiner

| First DCI | Second DCI |
|---|---|
| Aggregation level 1 | Aggregation level 1 |
| Aggregation level 2 | Aggregation level 2 |
| Aggregation level 4 | Aggregation level 4 |
| Aggregation level 8 | Aggregation level 8 |

FIG. 7

| First DCI | Coding rate of second DCI |
|---|---|
| Aggregation level 1 | 4/5 |
| Aggregation level 2 | 2/5 |
| Aggregation level 4 | 1/5 |
| Aggregation level 8 | 1/10 |

FIG. 8

| PDSCH MCS | | | Aggregation level of second DCI |
|---|---|---|---|
| MCS index $I_{MCS}$ | Modulation Order $Q_m$ | TBS index $I_{TBS}$ | |
| 0 | 2 | 0 | Aggregation level 8 |
| 1 | 2 | 1 | |
| 2 | 2 | 2 | |
| 3 | 2 | 3 | |
| 4 | 2 | 4 | |
| 5 | 2 | 5 | |
| 6 | 2 | 6 | |
| 7 | 2 | 7 | Aggregation level 4 |
| 8 | 2 | 8 | |
| 9 | 2 | 9 | |
| 10 | 4 | 9 | |
| 11 | 4 | 10 | |
| 12 | 4 | 11 | |
| 13 | 4 | 12 | |
| 14 | 4 | 13 | Aggregation level 2 |
| 15 | 4 | 14 | |
| 16 | 4 | 15 | |
| 17 | 6 | 15 | |
| 18 | 6 | 16 | |
| 19 | 6 | 17 | |
| 20 | 6 | 18 | |
| 21 | 6 | 19 | Aggregation level 1 |
| 22 | 6 | 20 | |
| 23 | 6 | 21 | |
| 24 | 6 | 22 | |
| 25 | 6 | 23 | |
| 26 | 6 | 24 | |
| 27 | 6 | 25 | |
| 28 | 6 | 26/26A | |
| 29 | 2 | | |
| 30 | 4 | | |
| 31 | 6 | | |

FIG. 9

| Modulation Order $Q_m$ | Second DCI |
|---|---|
| 2 | Aggregation level 8 |
| 4 | Aggregation level 4 |
| 6 | Aggregation level 2 |
| 8 | Aggregation level 1 |

FIG. 10

| PDSCH MCS | | | Second DCI | | |
|---|---|---|---|---|---|
| MCS index $I_{MCS}$ | Modulation Order $Q_m$ | TBS index $I_{TBS}$ | Desired coding rate | Number of CCEs for 40 bits | Number of CCEs for 20 bits |
| 0 | 2 | 0 | 0.0471 | 12 | 6 |
| 1 | 2 | 1 | 0.0580 | 10 | 5 |
| 2 | 2 | 2 | 0.0743 | 8 | 4 |
| 3 | 2 | 3 | 0.0996 | 6 | 3 |
| 4 | 2 | 4 | 0.1250 | 5 | 3 |
| 5 | 2 | 5 | 0.1540 | 4 | 2 |
| 6 | 2 | 6 | 0.1830 | 4 | 2 |
| 7 | 2 | 7 | 0.2192 | 3 | 2 |
| 8 | 2 | 8 | 0.2482 | 3 | 2 |
| 9 | 2 | 9 | 0.2844 | 2 | 1 |
| 10 | 4 | 9 | 0.1567 | 4 | 2 |
| 11 | 4 | 10 | 0.1821 | 4 | 2 |
| 12 | 4 | 11 | 0.2038 | 3 | 2 |
| 13 | 4 | 12 | 0.2292 | 3 | 2 |
| 14 | 4 | 13 | 0.2582 | 3 | 2 |
| 15 | 4 | 14 | 0.2799 | 2 | 1 |
| 16 | 4 | 15 | 0.2944 | 2 | 1 |
| 17 | 6 | 15 | 0.2156 | 3 | 2 |
| 18 | 6 | 16 | 0.2349 | 3 | 2 |
| 19 | 6 | 17 | 0.2639 | 3 | 2 |
| 20 | 6 | 18 | 0.2832 | 2 | 1 |
| 21 | 6 | 19 | 0.3025 | 2 | 1 |
| 22 | 6 | 20 | 0.3219 | 2 | 1 |
| 23 | 6 | 21 | 0.3460 | 2 | 1 |
| 24 | 6 | 22 | 0.3750 | 2 | 1 |
| 25 | 6 | 23 | 0.3895 | 2 | 1 |
| 26 | 6 | 24 | 0.4523 | 2 | 1 |
| 27 | 6 | 25 | 0.3895 | 2 | 1 |

FIG. 11

TERMINAL AND COMMUNICATION METHOD WITH TWO STEP DOWNLINK CONTROL INFORMATION

TECHNICAL FIELD

The present disclosure relates to a terminal, a base station, and a communication method.

BACKGROUND ART

A communication system so called the fifth generation mobile communication system (5G) has been under study. In 5G, studies have been conducted on flexibly providing functions respectively for use cases where communication traffic increases, where the number of terminals to be connected increases, and where high reliability and/or low latency is required. There are three representative use cases, which are enhanced Mobile Broadband (eMBB), massive Machine Type Communications (mMTC), and Ultra Reliable and Low Latency Communications (URLLC). The 3rd Generation Partnership Project (3GPP), which is an international standardization organization, has been conducting studies on further evolution of the communication system from both aspects of further evolution of the LTE systems and New Radio Access Technology (RAT) (see, e.g., Non-Patent Literature (hereinafter, referred to as "NPL") 1).

As a downlink (DL) control signal (downlink control information (DCI)) for New RAT, two steps DCI (hereinafter, referred to as "two step DCI" or "two stage DCI") has been under study. The two step DCI is a method in which information contained in the DCI is split into first and second DCIs.

CITATION LIST

Non-Patent Literature

NPL 1
RP-161596, "Revision of SI: Study on New Radio Access Technology," NTT DOCOMO, September 2016
NPL 2
R1-1613668, "WF on two stage DCI design," Huawei, HiSilicon, Qualcomm, OPPO, Convida, ZTE, Fujitsu, Mediatek, InterDigital, Intel, November 2016
NPL 3
3GPP TS 36.213 V13.3.0, "Physical procedures (Release 13)," September 2016

SUMMARY OF INVENTION

In the two step DCI, a method of determining a resource to which a DCI (particularly, second DCI) is mapped needs to be studied.

One non-limiting and exemplary embodiment facilitates providing a terminal, a base station, and a communication method each capable of appropriately determining a resource to which a DCI (particularly, second DCI) is mapped.

A terminal according to an aspect of the present disclosure includes: a receiver, which in operation, receives a first downlink (DL) control signal and a second DL control signal; and circuitry, which, in operation, demultiplexes a DL data signal from a received signal, using the first DL control signal and the second DL control signal, in which the receiver identifies a resource for the second DL control signal based on information on the first DL control signal, or information on the DL data signal, indicated by the first DL control signal.

A base station according to an aspect of the present disclosure includes: circuitry, which, in operation, generates a first downlink (DL) control signal and a second DL control signal; and a transmitter, which in operation, transmits the first DL control signal and the second DL control signal, and a DL data signal, in which the transmitter transmits the second DL control signal, using a resource configured based on information on the first DL control signal, or information on the DL data signal, indicated by the first DL control signal.

A communication method according to an aspect of the present disclosure includes: receiving a first downlink (DL) control signal and a second DL control signal; and demultiplexing a DL data signal from a received signal, using the first DL control signal and the second DL control signal, in which a resource for the second DL control signal is identified based on information on the first DL control signal, or information on the DL data signal, indicated by the first DL control signal.

A communication method according to an aspect of the present disclosure includes: generating a first downlink (DL) control signal and a second DL control signal; and transmitting the first DL control signal and the second DL control signal, and a DL data signal, in which the second DL control signal is transmitted, using a resource configured based on information on the first DL control signal, or information on the DL data signal, contained in the first DL control signal.

Note that the comprehensive or specific aspects mentioned above may be implemented by a system, an apparatus, a method, an integrated circuit, a computer program or a recoding medium, or any combination of the system, the apparatus, the method, the integrated circuit, the computer program, and the recoding medium.

According to an aspect of this disclosure, a resource to which a DCI (particularly, second DCI) is mapped can be appropriately identified.

The specification and the drawings make it clear more advantages and effects in an aspect of this disclosure. Such advantages and/or effects are provided by the features disclosed in some embodiments as well as the specification and the drawings, but all of them do not have to be provided in order to obtain one or more identical features.

BRIEF DESCRIPTION OF DRAWINGS

FIG. 7 is a diagram illustrating an example of an association between sizes of first and second DCIs according to Embodiment 1;

FIG. 8 is a diagram illustrating another example of an association between sizes of the first and second DCIs according to Embodiment 1;

FIG. 9 is a diagram illustrating an example of an association between MCS for data and sizes of the second DCI according to Embodiment 1;

FIG. 10 is a diagram illustrating an example of an association between data modulation schemes and sizes of the second DCI according to Embodiment 1;

FIG. 11 is a diagram illustrating an example of an association between MCS for data and sizes of the second DCI according to Embodiment 1;

DESCRIPTION OF EMBODIMENTS

Hereinafter, a detailed description will be given of embodiments of the present disclosure with reference to the accompanying drawings.

The two step DCI is advantageous in that, transmitting a first DCI containing a resource region where channel estimation is performed (channel estimation region) from a base station (hereinafter, may be referred to as "eNB") to a terminal (hereinafter, may be referred to as "user equipment (UE)") allows the terminal to start channel estimation before decoding of a second DCI. In addition, the two step DCI is advantageous in that, splitting the information contained in a DCI into the first and the second DCIs can reduce the code length of the first DCI, and thus can reduce the size of the search space for the first DCI.

The resource to which the first DCI is mapped herein is possibly determined in a manner similar to that in LTE/LTE-Advanced. Meanwhile, as to a method of identifying the resource to which the second DCI is mapped, studies have been conducted on, for example, a method in which a given resource is used or a method in which a resource is indicated by the first DCI.

However, in the method in which a given resource is allocated for the second DCI, the resource for the second DCI needs to be configured so as not to interrupt resource allocation for another terminal, and this complicates the processing. Meanwhile, with the method in which the first DCI indicates the resource to which the second DCI is assigned, information for identifying the resource for the second DCI needs to be added to the first DCI, and such addition increases the length of the first DCI.

In this respect, a description will be hereinafter given of a method of efficiently identifying the resource for the second DCI.

[Assumptions]

Base stations map a first DCI to any region called a search space. Moreover, the first DCI is configured with any of multiple aggregation levels. The term "aggregation level" is a value indicating a resource amount for the first DCI.

Terminals perform monitoring (blind decoding) on the first DCI for multiple aggregation levels, and when succeeding in reception, determine that there is resource allocation for the first DCI for the terminal that has succeeded in reception. Performing the monitoring for multiple aggregation levels by the terminal enables adjustment of redundancy of the first DCI in accordance with channel quality between the base station and the terminal.

[Summary of Communication System]

A communication system according to each embodiment of the present disclosure includes base station 100 and terminal 200.

Figure 1:
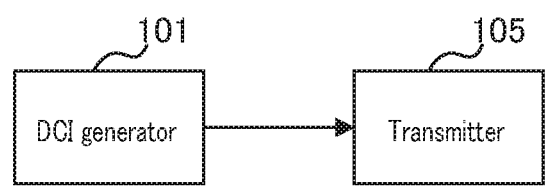
FIG. 1 is a block diagram illustrating a configuration of a base station according to Embodiment 1.

FIG. 1 is a block diagram illustrating a configuration of base station 100 according to an embodiment of the present disclosure. In base station 100 illustrated in FIG. 1, DCI generator 101 generates first downlink control information (first DCI) and second downlink control information (second DCI), and transmitter 105 transmits the first and the second DCIs, and a DL data signal. Note that, transmitter 105 transmits the second DCI using a resource configured based on information on the first DCI or information on the DL data signal, which is indicated by the first DCI.

Figure 2:
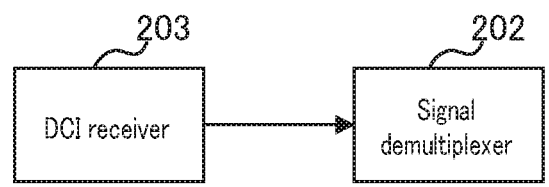
FIG. 2 is a block diagram illustrating a configuration of a terminal according to Embodiment 1.

FIG. 2 is a block diagram illustrating a configuration of terminal 200 according to an embodiment of the present disclosure. In terminal 200 illustrated in FIG. 2, DCI receiver 203 receives the first and the second DCIs, and signal demultiplexer 202 demultiplexes the DL data signal using the first and the second DCIs. Note that, DCI receiver 203 identifies the resource for the second DCI based on the information on the first DCI or the information on the DL data signal, which is indicated by the first DCI.

Embodiment 1

[Configuration of Base Station]

Figure 3:
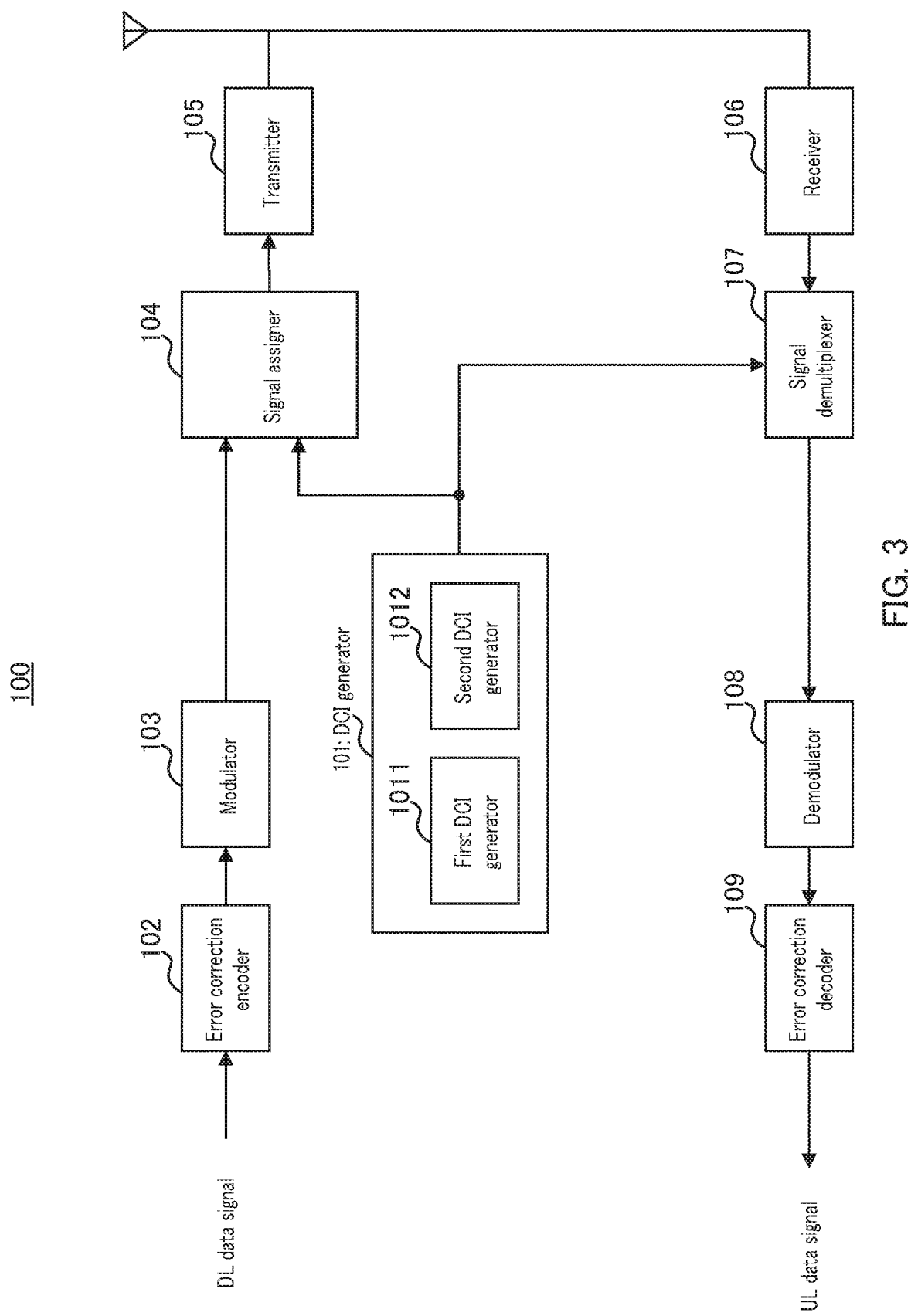
FIG. 3 is another block diagram illustrating a configuration of the base station according to Embodiment 1.

FIG. 3 is a block diagram illustrating a configuration of base station 100 according to the present embodiment. Base station 100 in FIG. 3 includes DCI generator 101, error correction encoder 102, modulator 103, signal assigner 104, transmitter 105, receiver 106, signal demultiplexer 107, demodulator 108, and error correction decoder 109.

DCI generator 101 generates a DL control signal (DCI) for assigning a DL data signal or a UL data signal. DCI generator 101 is composed of first DCI generator 1011 and second DCI generator 1012. DCI generator 101, for example, when the generated control signal is long (e.g., when longer than a configured threshold), splits the generated control signal into first and second DCIs.

First DCI generator 1011 generates a first DCI. The first DCI may contain, for example, information indicating whether a data signal assigned by the control signal is a retransmission signal or not, an HARQ process number (process ID), a sounding reference signal (SRS) request, a modulation and coding scheme (MCS) for data and/or the like. The SRS request herein may be contained in the first DCI for securing time to generate a reference signal on the transmitter side (terminal 200). Moreover, the information indicating whether the data signal is a retransmission signal or not and the control signal indicating the HARQ process number may be mapped to the first DCI in order to secure time for terminal 200 to determine whether to delete buffer or not, and to prepare for deletion, in case of DL data signal assignment, and may be contained in the first DCI in order to secure time for terminal 200 to prepare for a transmission signal in case of UL data signal assignment. Moreover, in case of DL data signal assignment, the first DCI may contain a control signal and/or the like for identifying a region where channel estimation is performed (channel estimation region) by terminal 200.

Second DCI generator 1012 generates a second DCI. The second DCI, for example, contains remaining information of the generated control signal, which is not contained in the first DCI.

Note that, in DCI generator 101, which information is mapped to each of the first and the second DCIs may be determined variably, and information that does not fit into the first DCI may be mapped to the second DCI. Furthermore, DCI generator 101 may only generate the first DCI and does not have to generate the second DCI when the information amount of the control signal to be generated is small.

DCI generator 101 outputs the generated DCI (first DCI, or first and second DCIs) to signal assigner 104. DCI generator 101 outputs DL assignment information of the generated DCI to signal assigner 104 and outputs UL assignment information to signal demultiplexer 107.

Error correction encoder 102 applies error correction coding to a transmission data signal (DL data signal) and outputs the encoded signal to modulator 103.

Modulator 103 applies modulation processing to the signal received from error correction encoder 102 and outputs the modulated signal to signal assigner 104.

Signal assigner 104 assigns the DL data signal received from modulator 103 and the DCI (first and second DCIs), which is the control signal received from DCI generator 101, to a DL resource based on the DL assignment information inputted from DCI generator 101. More specifically, signal assigner 104 assigns the DL data signal to a data region based on the DL assignment information contained in the first or the second DCI.

Signal assigner 104 maps the first DCI to a search space for the first DCI. The aggregation level of the first DCI herein is determined based on the channel quality and the information amount of the first DCI. Meanwhile, a resource (resource size and resource region (position)) to which the second DCI is assigned is identified from a signal that is used for a purpose different from that of a signal on the second DCI and that is contained in the first DCI, or information for identifying the first DCI (details will be given, hereinafter). The transmission signal is formed in this manner. The transmission signal thus formed is outputted to transmitter 105.

Transmitter 105 applies radio transmission processing such as up-conversion to the transmission signal inputted from signal assigner 104 and transmits the resultant signal to terminal 200 via an antenna.

Receiver 106 receives, via an antenna, a signal transmitted from terminal 200, applies radio reception processing such as down-conversion to the received signal, and transmits the resultant signal to signal demultiplexer 107.

Signal demultiplexer 107 demultiplexes a UL data signal from the received signal received from receiver 106, based on the UL assignment information inputted from DCI generator 101, and outputs the the UL data signal to demodulator 109.

Demodulator 108 applies demodulation processing to the signal inputted from signal demultiplexer 107 and outputs the resultant signal to error correction decoder 109.

Error correction decoder 109 decodes the signal inputted from demodulator 108 to acquire the received data signal (UL data signal) from terminal 200.

[Configuration of Terminal]

Figure 4:
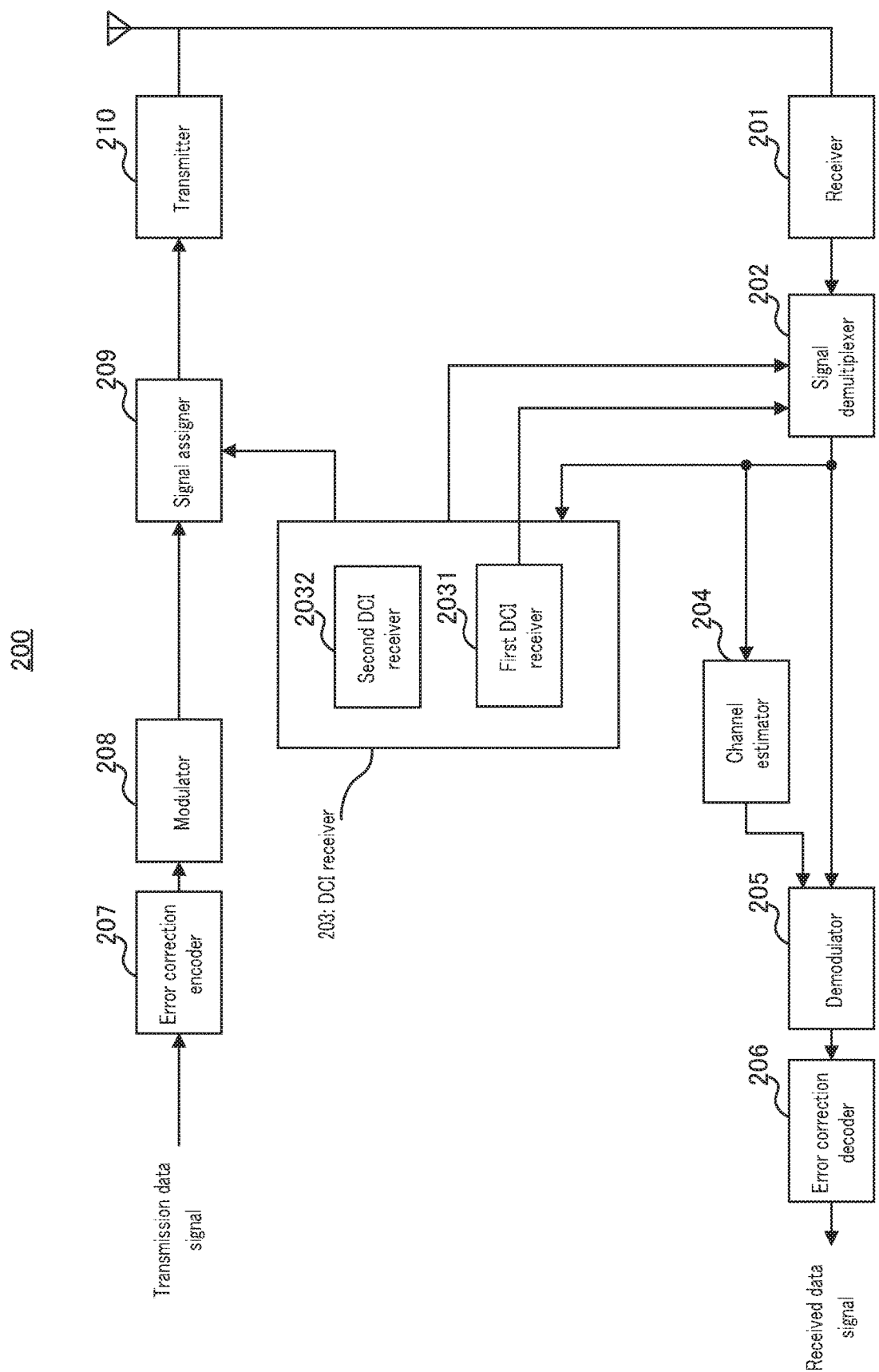
FIG. 4 is another block diagram illustrating a configuration of the terminal according to Embodiment 1.

FIG. 4 is a block diagram illustrating a configuration of terminal 200 according to the present embodiment. In FIG. 4, terminal 200 includes receiver 201, signal demultiplexer 202, DCI receiver 203, channel estimator 204, demodulator 205, error correction decoder 206, error correction encoder 207, modulator 208, signal assigner 209, and transmitter 210.

Receiver 201 receives the received signal via an antenna and outputs the received signal to signal demultiplexer 202 after application of reception processing such as down-conversion to the received signal.

Signal demultiplexer 202 demultiplexes a signal mapped to a resource (search space region) to which the first DCI may have been assigned, from the received signal received from receiver 201, and outputs the demultiplexed signal to DCI receiver 203 (first DCI receiver 2031 to be described, hereinafter). Signal demultiplexer 202 identifies a resource for the second DCI based on the information inputted from DCI receiver 203 (information used for identifying the resource for the second DCI), demultiplexes the second DCI from the received signal, and outputs the second DCI to DCI receiver 203 (second DCI receiver 2032 to be described, hereinafter).

Signal demultiplexer 202 outputs a signal of the DL data region of the received signal to channel estimator 204 based on the DL assignment information or information indicating a channel estimation region inputted from DCI receiver 203. Moreover, signal demultiplexer 202 demultiplexes a DL data signal from the received signal based on the DL assignment information inputted from DCI receiver 203 and outputs the DL data signal to demodulator 205.

DCI receiver 203 receives a control signal (DCI) indicating DL data signal or UL data signal assignment. DCI receiver 203 is composed of first DCI receiver 2031 and second DCI receiver 2032. When receiving a DCI containing DL resource allocation information, DCI receiver 203 outputs the DCI to signal demultiplexer 202, and when receiving a DCI containing UL resource allocation information, DCI receiver 203 outputs the DCI to signal assigner 209.

More specifically, first DCI receiver 2031 attempts decoding on a signal that is on a resource to which the first DCI may have been assigned (i.e., search space signal) and that is received from signal demultiplexer 202, and detects and receives the first DCI. Moreover, first DCI receiver 2031 outputs the information used for identifying the resource to which the second DCI is assigned to signal demultiplexer 202. The information used for identifying the resource to which the second DCI is assigned is not information indicated for identifying the resource for the second DCI, itself, but is information used for another purpose, such as an aggregation level, a coding rate, a channel estimation region and/or the like of of the first DCI, for example.

Second DCI receiver 2032 receives the signal of the resource region to which the second DCI received from signal demultiplexer 202 is assigned.

Channel estimator 204 performs channel estimation for the signal of the DL data region (i.e., channel estimation region) received from signal demultiplexer 202. Channel estimator 204 outputs channel estimation information indicating the result of channel estimation to demodulator 205.

Demodulator 205 demodulates the signal received from signal demultiplexer 202, based on the channel estimation information received from channel estimator 204 and outputs the demodulated signal to error correction decoder 206.

Error correction decoder 206 decodes the demodulated signal received from demodulator 205 and outputs the resultant received data signal.

Error correction encoder 207 applies error correction coding to the transmission data signal (UL data signal) and outputs the encoded data signal to modulator 208.

Modulator 208 modulates the data signal received from error correction encoder 207 and outputs the modulated data signal to signal assigner 209.

Signal assigner 209 assigns the data signal inputted from modulator 209 to a resource based on the UL assignment information received from DCI receiver 203, and outputs the resultant signal to transmitter 210.

Transmitter 210 applies transmission processing such as up-conversion to the signal inputted from signal assigner 209 and transmits the resultant signal via an antenna.

[Operations of Base Station 100 and Terminal 200]

Operations of base station 100 and terminal 200 having the configurations described above will be described in detail.

Figure 6:
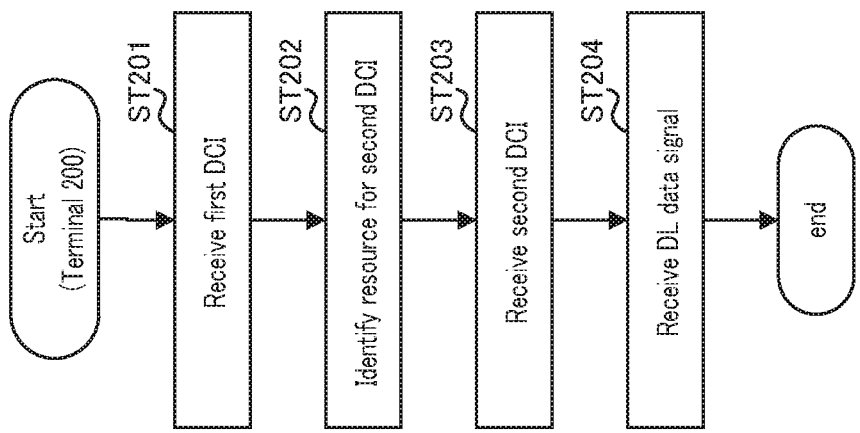
FIG. 6 is a flowchart illustrating an operation example of the terminal according to Embodiment 1.
Figure 5:
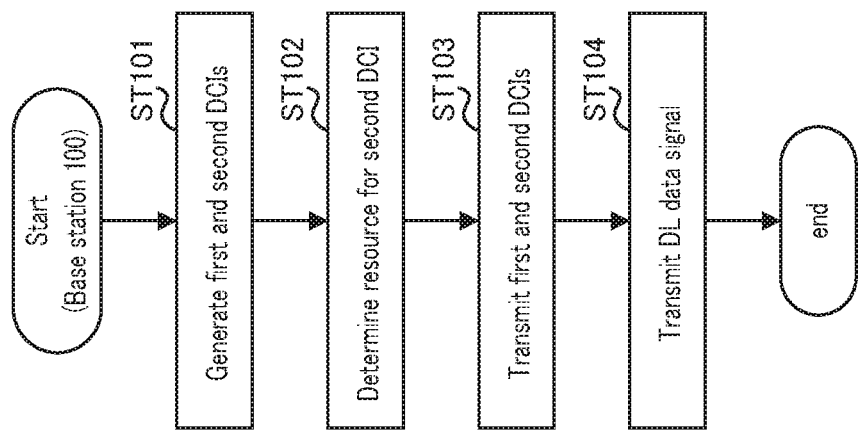
FIG. 5 is a flowchart illustrating an operation example of the base station according to Embodiment 1.

FIG. 5 is a flowchart illustrating an operation of base station 100, and FIG. 6 is a flowchart illustrating an operation of terminal 200.

Base station 100 generates first and second DCIs, first (ST101), and determines a resource (resource size) for the second DCI based on information contained in the first DCI (such as information on a DL data signal) or information on the first DCI (ST102). Note that, a method of determining a resource for a second DCI will be described in detail, hereinafter. Base station 100 transmits the first and the second DCIs to terminal 200 (ST103) and transmits the DL data signal indicated by the first and the second DCIs to terminal 200 (ST104).

Meanwhile, upon reception of the first DCI from base station 100 (ST201), terminal 200 identifies the resource (resource size) for the second DCI based on the information contained in the first DCI (such as information on the DL data signal) or the information on the the first DCI (ST202). Note that, a method of identifying a resource for a second DCI will be described in detail, hereinafter. Terminal 200 receives the second DCI based on the identified resource for the second DCI (ST203) and receives the DL data signal based on the received first and second DCIs (ST204).

More specifically, the resource to which the second DCI is assigned is implicitly indicated to terminal 200 by the information that is used for another purpose and contained in the first DCI, or the information configured in the first DCI. Accordingly, information for indicating the resource for the second DCI, itself, becomes unnecessary, and thus, an increase in the information amount of the first DCI can be prevented.

In this embodiment, a method of determining and/or identifying a size (resource size) of a second DCI (hereinafter, referred to as "second DCI size") from a first DCI will be described.

The term "second DCI size" used herein indicates an aggregation level or a coding rate of a DCI.

The aggregation level is used as a value indicating the resource amount for a DCI in LTE/LTE-Advanced. The larger the aggregation level, the greater the resource amount for the DCI is. Furthermore, when a DCI is transmitted in a Physical Downlink Control Channel (PDCCH) region, aggregation level 1 corresponds to one control channel element (CCE) in LTE. Note that, one CCE consists of 36 resource elements (REs). Likewise, aggregation level 2 corresponds to two CCEs (72 REs), aggregation level 4 corresponds to four CCEs (144 REs), and aggregation level 8 corresponds to eight CCEs (288 REs).

Moreover, the coding rate indicates a ratio of addition of a redundancy bit to an information bit. For example, when two redundancy bits are added to one information bit, the coding rate is 1/3. More specifically, the lower the coding rate, the higher the redundancy is, and for transmission of the same information bits, a larger resource amount is required.

Hereinafter, Operation Examples 1-1 and 1-2 according to the present embodiment will be described.

Operation Example 1-1

In Operation Example 1-1, the second DCI size is determined in accordance with the aggregation level of the first DCI.

The aggregation level of a first DCI is an aggregation level when a first DCI addressed to terminal 200 is detected by blind decoding for the first DCI in terminal 200. Stated differently, since terminal 200 identifies the second DCI size in accordance with the aggregation level of the first DCI identified by blind decoding, signaling for indicating the second DCI size becomes unnecessary.

For example, suppose that first and second DCIs are transmitted from same base station 100 and received by same terminal 200. In this case, an assumption can be made that reception qualities (e.g., Signal to Interference and Noise Ratio (SINR)) of the first and the second DCIs are equal to each other.

When the information amounts (the numbers of information bits) of the first and the second DCIs are equal to each other, and their target error rates are equal to each other, as illustrated in FIG. 7, the same value as the aggregation level of the first DCI may be configured for the aggregation level of the second DCI. Note that, the aggregation levels of the first and the second DCIs are not limited to the values illustrated in FIG. 7.

More specifically, base station 100 assigns the second DCI in accordance with the aggregation level associated with the aggregation level of the first DCI and transmits the second DCI. In addition, terminal 200 identifies the aggregation level associated with the aggregation level of the detected first DCI as the aggregation level of the second DCI and receives the the second DCI.

Moreover, when the information amount (the number of information bits) differs between the first and the second DCIs, the aggregation level of the second DCI may be determined using the following expression (Expression 1):

Aggregation Level of Second DCI=Number of Information Bits of Second DCI/Number of Information Bits of First DCI*Aggregation Level of First DCI (Expression 1).

In Expression 1, the rate of the number of information bits between the first and the second DCIs is found by (Number of Information Bits of Second DCI/Number of Information Bits of First DCI). More specifically, when the number of information bits of the second DCI is twice the number of information bits of the first DCI, the aggregation level of the second DCI is twice the aggregation level of the first DCI.

Note that, when the result of Expression 1 is not an integer, the result may be rounded off, rounded up, or rounded down to the nearest integer. Moreover, when given values such as 1, 2, 4, 8, and 16 are used as the aggregation levels, the result of Expression 1 may be caused to converge to the given values.

Next, a description will be given of a case where the second DCI size is defined by a coding rate rather than an aggregation level.

As illustrated in FIG. 8, the coding rate of a second DCI is determined in accordance with the aggregation level of a first DCI.

More specifically, base station 100 configures the second DCI with the coding rate associated with the aggregation level of the first DCI and transmits the second DCI. Terminal 200 identifies the coding rate associated with the aggregation level of the detected first DCI as the coding rate of the second DCI.

In FIG. 8, the coding rate of the second DCI associated with aggregation level 1 of the first DCI is set to 4/5, and when the aggregation level of the first DCI increases to X times (X=2, 4, 8 in FIG. 8), the coding rate of the second DCI becomes 1/X. In other words, the larger the aggregation level of the first DCI (the larger the resource amount for the first DCI), the lower the coding rate of the second DCI is. More specifically, the larger the aggregation level of the first DCI, the larger the resource amount for the second DCI is. Note that, the association between the aggregation levels of the first DCI and the coding rates of the second DCI is not limited to the case illustrated in FIG. 8.

Moreover, the coding rate of the second DCI may be found, using the following expression (Expression 2), such that the coding rate of the first DCI and the coding rate of the second DCI are equal to each other.

Coding Rate of Second DCI=Number of Information Bits of First DCI/Number of REs used for Transmission of First DCI*2)            (Expression 2)

In Expression 2, "(Number of Information Bits of First DCI/(Number of REs used for Transmission of First DCI*2))" indicates the coding rate of a case where the first DCI is subjected to QPSK modulation (modulation order=2).

As described above, in Operation Example 1-1, attention is given to the fact that there is a relationship between the reception qualities of the first and the second DCIs. Accordingly, Operation Example 1-1 is effective when the first and the second DCIs are mapped to the same symbol or the same Physical Resource Block (PRB), or symbols (PRBs) close to each other, or when the same antenna port and/or the same transmission scheme is used.

Note that, when the aggregation level is used as the second DCI size, there is a possibility that the resource amount (the number of REs) of aggregation level 1 of the first DCI and the resource amount (the number of REs) of aggregation level 1 of the second DCI are not equal to each other. For example, there is a case where the number of REs per CCE differs between the first and the second DCIs. In this case, base station 100 and terminal 200 may perform arithmetic operations using an additional variable for making the coding rates (resource amounts) of the first and the second DCIs equal to each other.

Operation Example 1-2

In Operation Example 1-2, the second DCI size is determined in accordance with an MCS for Physical Downlink Shared Channel (PDSCH), which is data (DL data signal) indicated by the first DCI.

The MCS for data represents the reception quality of data, which is predicted by base station 100.

When the second DCI is mapped to a resource region for data (PDSCH), it is possible to assume that the reception quality (e.g., SINR) of the second DCI and the reception quality of PDSCH are equal to each other.

In this respect, when the second DCI size is determined by the aggregation level, as illustrated in FIG. 9, the aggregation level of the second DCI is determined in accordance with the MCS for data (PDSCH). Note that, an assumption is made in FIG. 9 that the modulation scheme for the second DCI is QPSK. The association between the MCS of data and the aggregation levels of the second DCI is not limited to the case illustrated in FIG. 9.

Base station 100 assigns the second DCI in accordance with the aggregation level associated with the MCS for data indicated by the first DCI and transmits the second DCI. Furthermore, terminal 200 identifies the aggregation level associated with the MCS for data indicated by the detected first DCI, as the aggregation level of the second DCI, and receives the second DCI.

As illustrated in FIG. 9, when MCS index ($I_{MCS}$) is small, the modulation order becomes low, i.e., QPSK ($Q_m=2$), and the coding rate also becomes low, based on the assumption that the reception quality is poor. Moreover, the smaller the MCS index, the smaller the TBS index ($I_{TBS}$) is. Note that, the smaller the TBS index, the smaller the transport block size (TBS) to be assigned is (e.g., see NPL 3). More specifically, the smaller the MCS index, the smaller the TBS index is, and the number of information bits becomes small, but the number of redundancy bits becomes large, so that the coding rate becomes low. More specifically, in FIG. 9, as the MCS index becomes smaller, a larger information amount of the second DCI is assumed, and a larger value is associated as the aggregation level of the second DCI.

Note that, although a description has been given of the case where the MCS index and the aggregation level of a second DCI are associated with each other in FIG. 9, as illustrated in FIG. 10, the modulation scheme (modulation order $Q_m$) for data and the aggregation level of the second DCI may be associated with each other.

Next, a description will be given of a case where the second DCI size is defined by a coding rate rather than an aggregation level.

The coding rate of a second DCI may be determined based on the following expression (Expression 3) from the MCS for data indicated by the first DCI.

Coding Rate of Second DCI=Transport Block Size/ (N_PRB*Number of REs per PRB*Modulation Order*Number of Layers)            (Expression 3)

In Expression 3, "N_RB" represents the number of PRBs to which data is assigned. Moreover, the denominator in Expression 3 represents the number of bits transmittable by the assigned data region. For example, the larger the modulation order, the greater the number of transmittable bits per PRB is. Furthermore, as the number of layers for spatial multiplexing increases, the number of transmittable bits per PRB increases. Meanwhile, the numerator in Expression 3 represents the number of information bits.

The resource amount (the number of REs) for a second DCI is found by the following expression (Expression 4).

Resource Amount for Second DCI=Number of Information Bits of Second DCI/(Coding Rate of Second DCI*Modulation Order of Second DCI*Number of Layers of Second DCI)            (Expression 4)

When the resource amount for the second DCI is expressed in each unit composed of multiple REs such as in units of CCEs, PRBs and mini-slots, the resource amount for the second DCI may be determined while adjustment such as rounding-off, rounding-up, or rounding-down is made to match the target unit.

Although a description has been given of the case where the coding rates of data and a second DCI are made equal to each other, there is a possibility that a desired error rate required for the second DCI is low in comparison between desired error rates required for data and for the second DCI. Accordingly, the coding rate of the second DCI found by Expression 3 may be multiplied by 1/N to set the coding rate of the second DCI to be lower than the coding rate of the data.

Furthermore, as illustrated in FIG. 11, base station 100 and terminal 200 may include a table associating the MCS for data and the coding rate or the resource amount for the second DCI with each other, and may determine the coding rate or resource amount for the second DCI from the MCS for data with reference to the table.

The desired coding rate of the second DCI illustrated in FIG. 11 is found by the following expression (Expression 5).

Desired Coding Rate of Second DCI=½*Transport Block Size/(N_PRB*Number of REs per PRB*Modulation Order*Number of Layers)   (Expression 5)

In FIG. 11, N_PRB of data is 8, the number of REs per PRB is 138, and the number of layers is 1 in Expression 5, and multiplication of ½ is applied in order to set the coding rate of the second DCI to be lower than that of data.

The numbers of CCEs when the numbers of information bits of the second DCI illustrated in FIG. 11 are 40 bits and 20 bits (the number of CCEs for 40 bits and the number of CCEs for 20 bits) are calculated as the numbers of CCEs that are required when the number of REs per CCE is assumed to be 36. Moreover, the modulation order for the second DCI is assumed to be 2 (QPSK). In this case, the number of CCEs for the second DCI is found by the following expression (Expression 6).

Number of CCEs=Ceiling (Number of Information Bits/Desired Coding Rate/2/36)   (Expression 6).

Operation Examples 1-1 and 1-2 for determining the second DCI size have been described thus far.

As described above, in Embodiment 1, the second DCI size is determined in accordance with information on the first DCI (aggregation level herein) or information indicated by the first DCI (MCS for data herein). Thus, base station 100 can implicitly indicate the second DCI size, using the first DCI, and terminal 200 can identifies the second DCI size, using the first DCI. More specifically, according to Embodiment 1, the second DCI size can be indicated to terminal 200 without any increase in the number of information bits of the first DCI. Thus, according to Embodiment 1, terminal 200 can appropriately identify the resource to which the second DCI is mapped.

Embodiment 2

It is possible that, in order for UEs to perform channel estimation for data at an early stage, base stations indicate, to the UEs, using a first DCI, a resource region where channel estimation is performed (channel estimation region), and indicate detailed resource allocation, using a second DCI. In this case, the first DCI is mapped in a forward transmission unit (subframe/slot/mini-slot/sub-slot) in the time domain. The UEs start channel estimation after reception of the first DCI and then receive the second DCI.

[Problem]

Figure 12A:
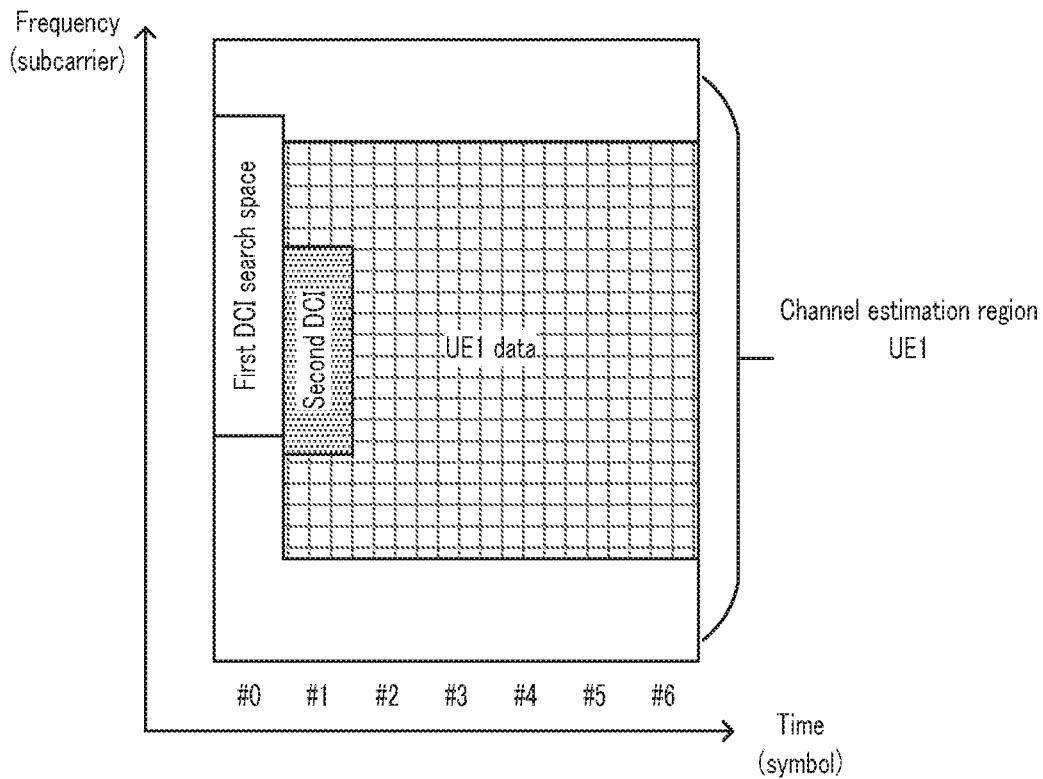
FIG. 12A is a diagram illustrating a mapping example of a second DCI according to Embodiment 2.

In the above operation, the data region (channel estimation region) indicated by the first DCI is a range where the UE performs channel estimation and is possibly larger than the actually assigned data region, which is indicated by the second DCI (PDSCH resource region. The region indicated by UE1 data in FIG. 12A). As illustrated in FIG. 12A, the second DCI is possibly mapped to the data region.

As illustrated in FIG. 12A, when the frequency resource to which the second DCI is mapped is contained in the frequency resource to which data (UE1 data) is assigned, UE1 can identify to which frequency resource the second DCI is assigned, after reception of the second DCI, and thus can recognize that the region other than the region to which the second DCI is mapped is the resource to which data is mapped.

Figure 12B:
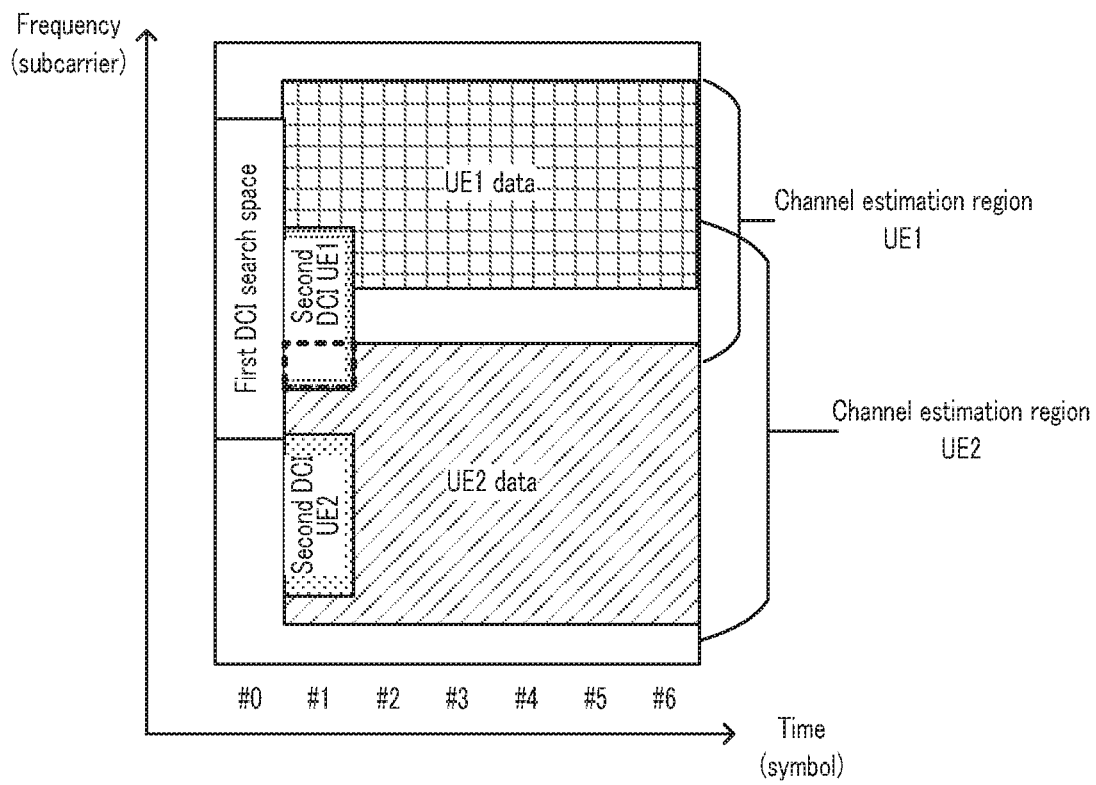
FIG. 12B is a diagram provided for describing a problem in Embodiment 2.

However, as illustrated in FIG. 12B, when the frequency resource to which the second DCI for UE1 is mapped is located at the frequency resource where no data of UE1 is assigned (resource surrounded by a dotted line in FIG. 12B), there arises a problem in that it is difficult for a base station to assign, to UE2, a rearward symbol of a frequency resource to which no data of UE1 is assigned. Since UE2 cannot detect any second DCI not addressed to UE2, UE2 cannot identify to which region the second DCI addressed to UE1 is mapped. Accordingly, there arises a problem in that, when assigning data for a UE, the base station cannot assign the data for the UE to the frequency resource to which the second DCI for another UE is mapped. Moreover, for example, in FIG. 12B, when a base station assigns, to a UE, the frequency resource to which the second DCI for another UE is mapped, the base station needs to assign a frequency resource of symbol #2 or subsequent symbols, excluding symbol #1 to which the second DCI for UE1 is mapped, and this complicates the processing.

In this respect, in Embodiment 2, a description will be given of a method of appropriately identifying a frequency resource (resource position) to which a second DCI is mapped.

Note that, a base station and a terminal according to Embodiment 2 have basic configurations common to base station 100 and terminal 200 according to Embodiment 1, so that a description will be given while FIGS. 3 and 4 are incorporated herein.

More specifically, base station 100 determines a resource (resource region) for a second DCI based on information indicating a channel estimation region, which is contained in a first DCI (ST102 illustrated in FIG. 5). Meanwhile, terminal 200 identifies the resource (resource region) for the second DCI based on the information indicating the channel estimation region, which is contained in the first DCI indicated by base station 100 (ST202 illustrated in FIG. 6).

More specifically, as in Embodiment 1, the resource to which the second DCI is assigned is implicitly indicated to terminal 200 by the information that is used for another purpose and contained in the first DCI. This makes the information for indicating the resource for the second DCI, itself, unnecessary and can prevent an increase in the information amount of the first DCI.

Hereinafter, a detailed description will be given of a method of identifying the frequency domain for the second DCI from information contained in the first DCI.

Operation Example 2-1

Figure 13:
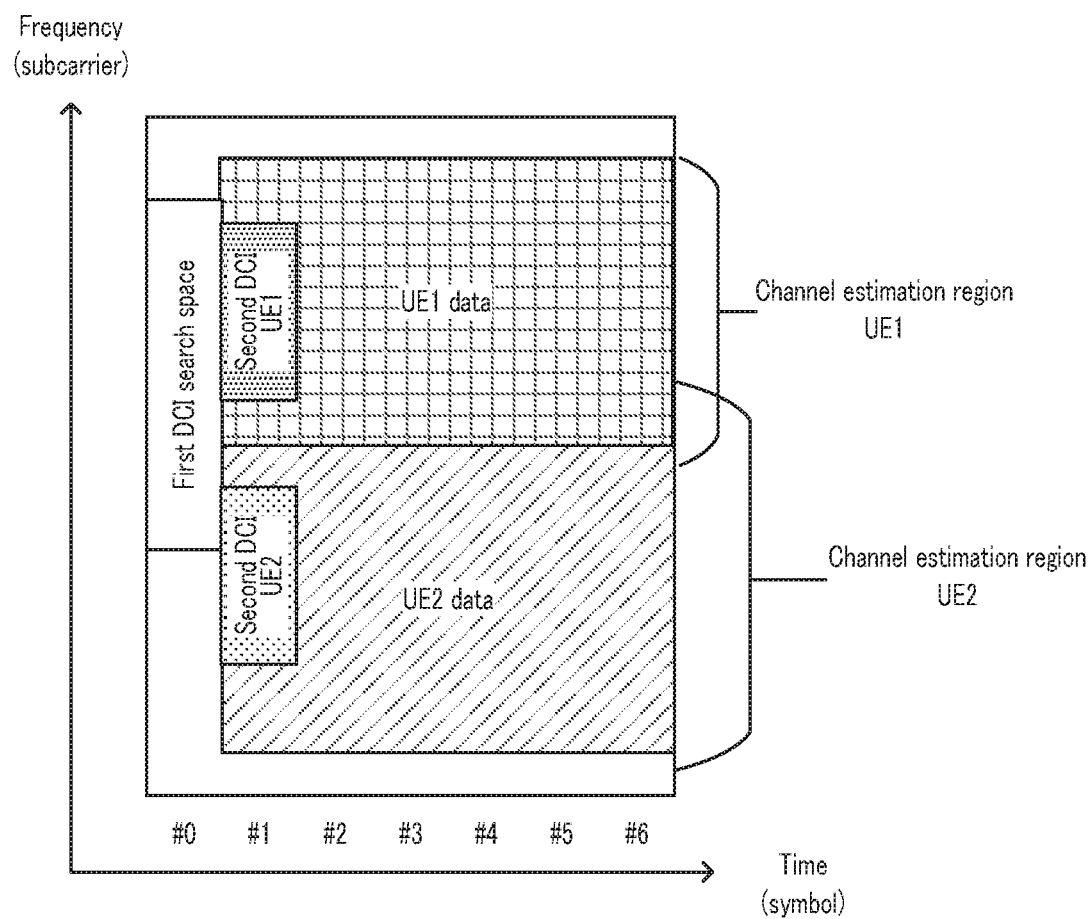
FIG. 13 is a diagram illustrating a mapping example of the second DCIs according to Embodiment 2 (Operation Example 2-1)

In Operation Example 2-1, as illustrated in FIG. 13, the second DCIs are each mapped to a frequency domain at a center of the channel estimation region indicated by the first DCI.

More specifically, base station 100 maps the second DCI to the frequency domain at the center of the channel estimation region indicated by the first DCI and transmits the second DCI. Meanwhile, terminal 200 identifies the frequency domain at the center of the channel estimation region indicated by the first DCI, as the region to which the second DCI is mapped, and receives the second DCI.

In this case, as illustrated in FIG. 13, base station 100 assigns data to terminal 200 in such a way that the frequency domain to which the second DCI is mapped is contained. Moreover, when indicating the channel estimation region using the first DCI, base station 100 makes adjustment of the resource amount in data assignment between UE1 and another user (UE2) mainly at an edge of the channel estimation region with an assumption that data of UE1 is assigned to the frequency domain at the center of the channel estimation region.

For example, in FIG. 13, the second DCIs of UE1 and UE2 are mapped to the frequency domains at the centers of the respective channel estimation regions. In this case, base station 100 adjusts the resource amount between UE1 and UE2 in the interval where the channel estimation regions of the UEs overlap with each other.

Thus, as illustrated in FIG. 13, as a result of the adjustment of the resource amount between the UEs by base station 100, the possibility of the second DCI for terminal 200 being assigned to the outside of the range of the data region for this terminal 200 becomes low. Accordingly, in base station 100, it is made possible to prevent the frequency resource to which the second DCI for terminal 200 is mapped from making data assignment for another UE impossible. Note that, terminal 200 can recognize, after reception of the second DCI, that the region other than the region to which the second DCI is mapped in the data region is the resource to which the data is mapped.

The method in Operation Example 2-1 (FIG. 13) is suitable for a case where data pieces of multiple terminals 200 are supposed to be assigned sequentially in the frequency domain. For example, in FIG. 13, data is assigned simultaneously to UE1 and UE2, and the channel estimation regions indicated by the first DCIs, respectively, to UE1 and UE2 include an overlapping portion.

Operation Example 2-2

Figure 14:
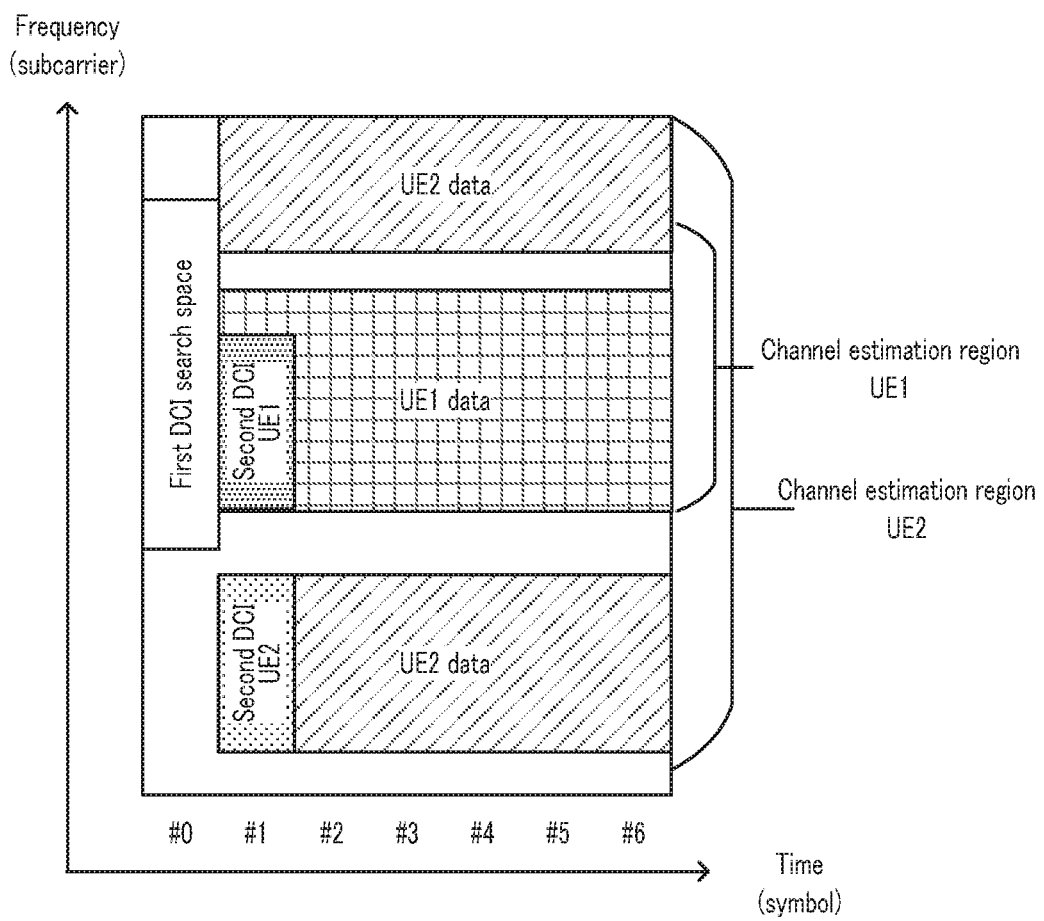
FIG. 14 is a diagram illustrating a mapping example of the second DCIs according to Embodiment 2 (Operation Example 2-2)

In Operation Example 2-2, as illustrated in FIG. 14, the second DCIs are each mapped to a frequency domain at an edge of the channel estimation region indicated by the first DCI. Note that, as a frequency domain to which the second DCI is mapped, two cases are possible where a one-side edge of the channel estimation region is used and where both edges are used.

More specifically, base station 100 maps the second DCI to a frequency domain at an edge of the channel estimation region indicated by the first DCI and transmits the second DCI. Meanwhile, terminal 200 identifies the frequency domain at the edge of the channel estimation region, which is indicated by the first DCI, as the region to which the second DCI is mapped, and receives the second DCI.

In this case, as illustrated in FIG. 14, base station 100 may assign data to terminal 200 in such a way that the frequency domain to which the second DCI is mapped is contained. Moreover, when indicating the channel estimation region using the first DCI, base station 100 makes adjustment of the resource amount in data assignment between UE1 and another user (UE2) mainly at the region other than the edge of the channel estimation region with the assumption that data of UE1 is assigned to the frequency domain at the edge of the channel estimation region.

For example, in FIG. 14, data is assigned simultaneously to UE1 and UE2. In FIG. 14, the second DCI for each of the UEs is mapped to a one-side edge of the channel estimation region of the UE. In this case, base station 100 may map data to the one-side edge of the channel estimation region to which the second DCI is mapped, for each of the UEs.

Moreover, in FIG. 14, the frequency domain to which the second DCI for UE1 is mapped is contained in the channel estimation region of UE2. In this case, base station 100 may map data of UE2 while avoiding the frequency domain to which the second DCI for UE1 is mapped. For example, when indicating the channel estimation region using the first DCI, base station 100 determines the data assignment of the frequency domain at both edges of the channel estimation region (i.e., the region where the second DCI is mapped) and makes adjustment of the resource amount in data assignment in the region other than these edges. More specifically, in FIG. 14, base station 100 may make adjustment of the resource amount between UE1 and UE2 in the region other than the frequency domain to which the second DCI for UE1 is mapped in the interval where the channel estimation regions of the UEs overlap with each other.

Accordingly, as illustrated in FIG. 14, as a result of the adjustment of the resource amount between the UEs by base station 100, the possibility of the second DCI for terminal 200 being assigned to the outside of the range of the data region for this terminal 200 becomes low. Thus, in base station 100, it is made possible to prevent the frequency resource to which the second DCI for terminal 200 is mapped from making data assignment for another UE impossible. Note that, terminal 200 can recognize, after reception of the second DCI, that the region other than the region to which the second DCI is mapped in the data region is the resource to which the data is mapped.

Figure 15:
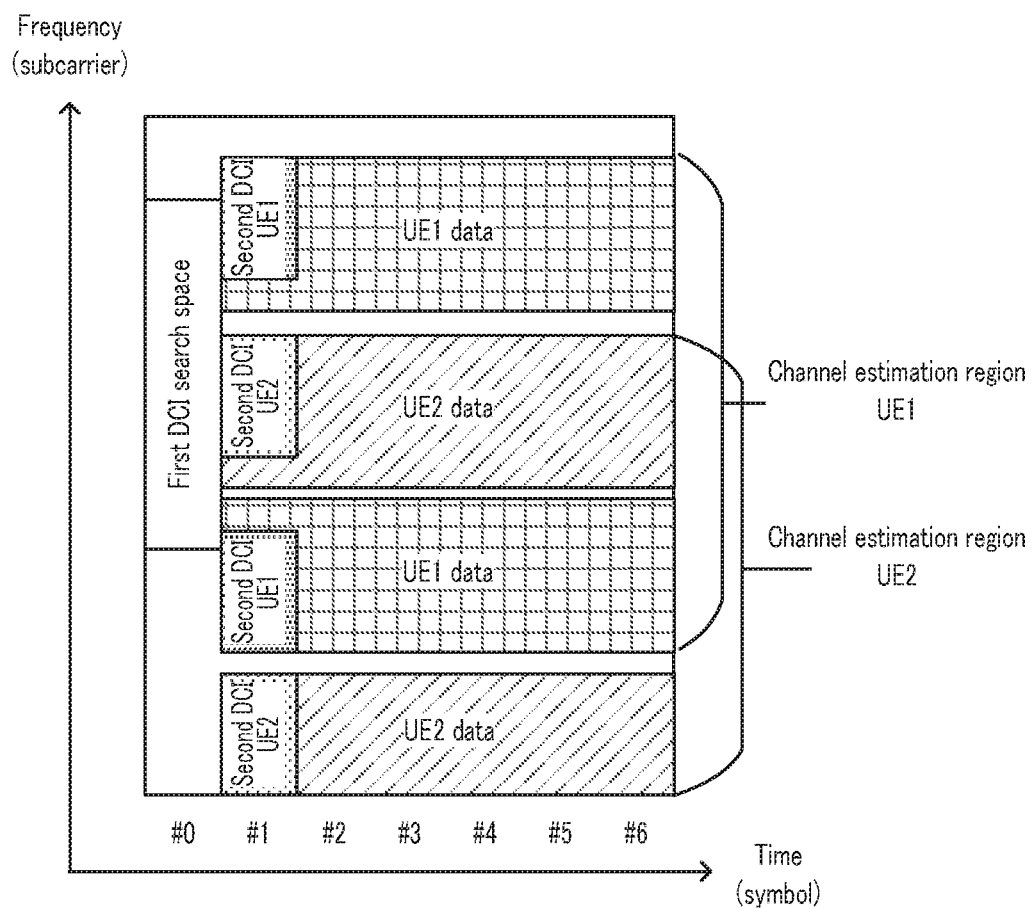
FIG. 15 is a diagram illustrating a mapping example of the second DCIs according to Embodiment 2 (Operation Example 2-2)

For example, in FIG. 15, data is assigned simultaneously to UE1 and UE2. In FIG. 15, the second DCIs of each of the UEs are mapped to both edges of the channel estimation region of the UE. In this case, base station 100 may map data to both edges of the channel estimation region to which the second DCIs are mapped, for each of the UEs.

As illustrated in FIG. 15, when the second DCIs are mapped to both edges of the channel estimation region, the second DCIs are mapped to positions distant from each other in the frequency domain, so that the frequency diversity effect can be obtained. FIG. 15 is particularly suitable for a case where data is assigned in a non-contiguous manner.

Operation Example 2-3

Figure 16:
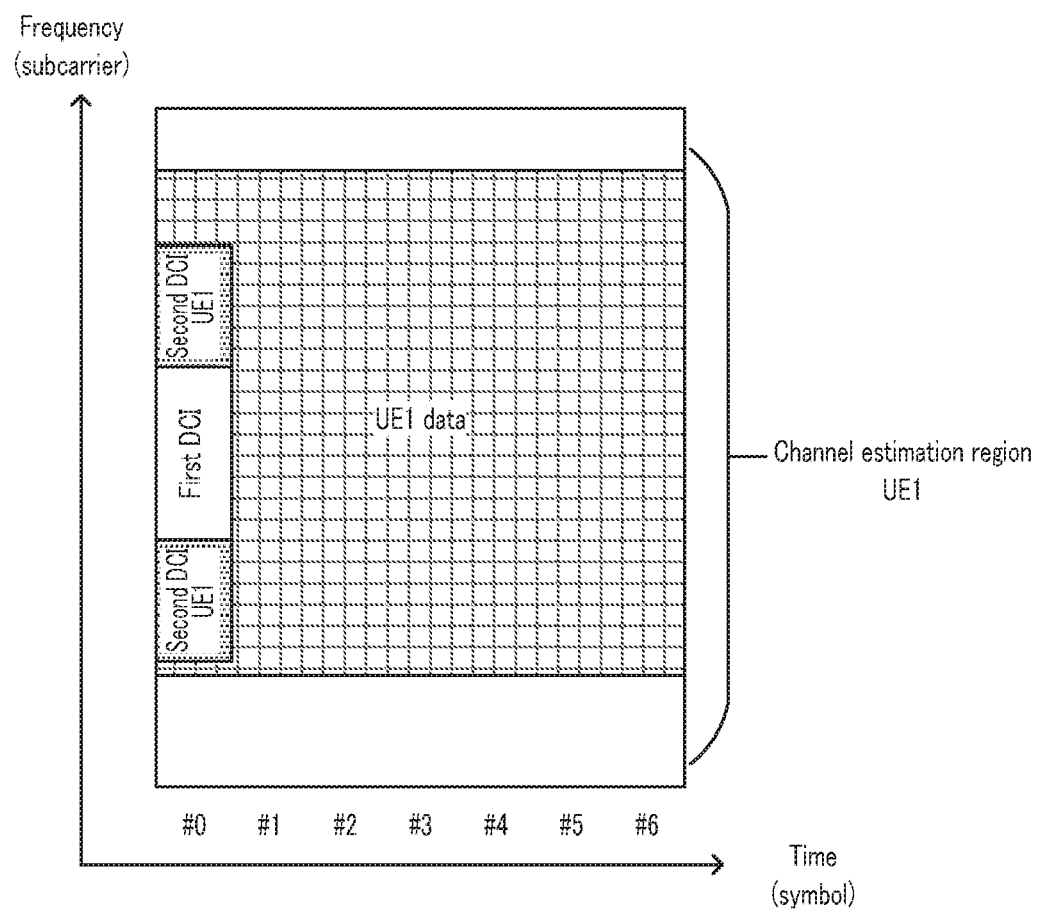
FIG. 16 is a diagram illustrating a mapping example of the second DCIs according to Embodiment 2 (Operation Example 2-3)

In Operation Example 2-3, as illustrated in FIG. 16, the second DCIs are assigned to regions adjacent to the frequency domain to which the first DCI is mapped.

In this case, more specifically, base station 100 maps the second DCIs to the frequency domain adjacent to the frequency domain to which the first DCI is mapped, and transmits the second DCIs. Moreover, terminal 200 identifies the frequency domain adjacent to the frequency domain where the first DCI is detected, as the regions to which the second DCIs are mapped, and receives the second DCIs. Terminal 200 determines the mapping of the second DCIs based on the region where the first DCI for terminal 200 is detected, rather than the search space for the first DCI.

Note that, the term "adjacent region" used herein includes an adjacent region in the frequency domain and a logically adjacent region (e.g., CCE numbers are consecutive). Moreover, the term "adjacent region" may include a region to which a certain offset is added.

It is possible that, when indicating the channel estimation region using the first DCI, base station 100 assigns data in such a way that the frequency domain to which the first DCI is mapped is contained. For this reason, as illustrated in FIG. 16, assigning data as well as the second DCIs to the regions adjacent to the region to which the first DCI is mapped makes the possibility of the second DCIs for terminal 200 being assigned to the outside of the range of the data region for this terminal 200 low. Accordingly, it is made possible to prevent the frequency resource to which the second DCI for terminal 200 is mapped from making data assignment for another UE impossible.

In addition, as illustrated in FIG. 16, since data is assigned to the regions adjacent to the region to which the first DCI is mapped, the assignment becomes contiguous, so that it is made possible to limit the channel estimation region.

In Operation Example 2-3, by excluding the region where terminal 200 has detected the first and the second DCIs (symbol #0 in FIG. 16) from the data assignment region, base station 100 can map data to the frequency domain where the first and the second DCIs are not mapped (symbol #1 and subsequent symbols) from the start symbol.

Operation Example 2-4

Figure 17:
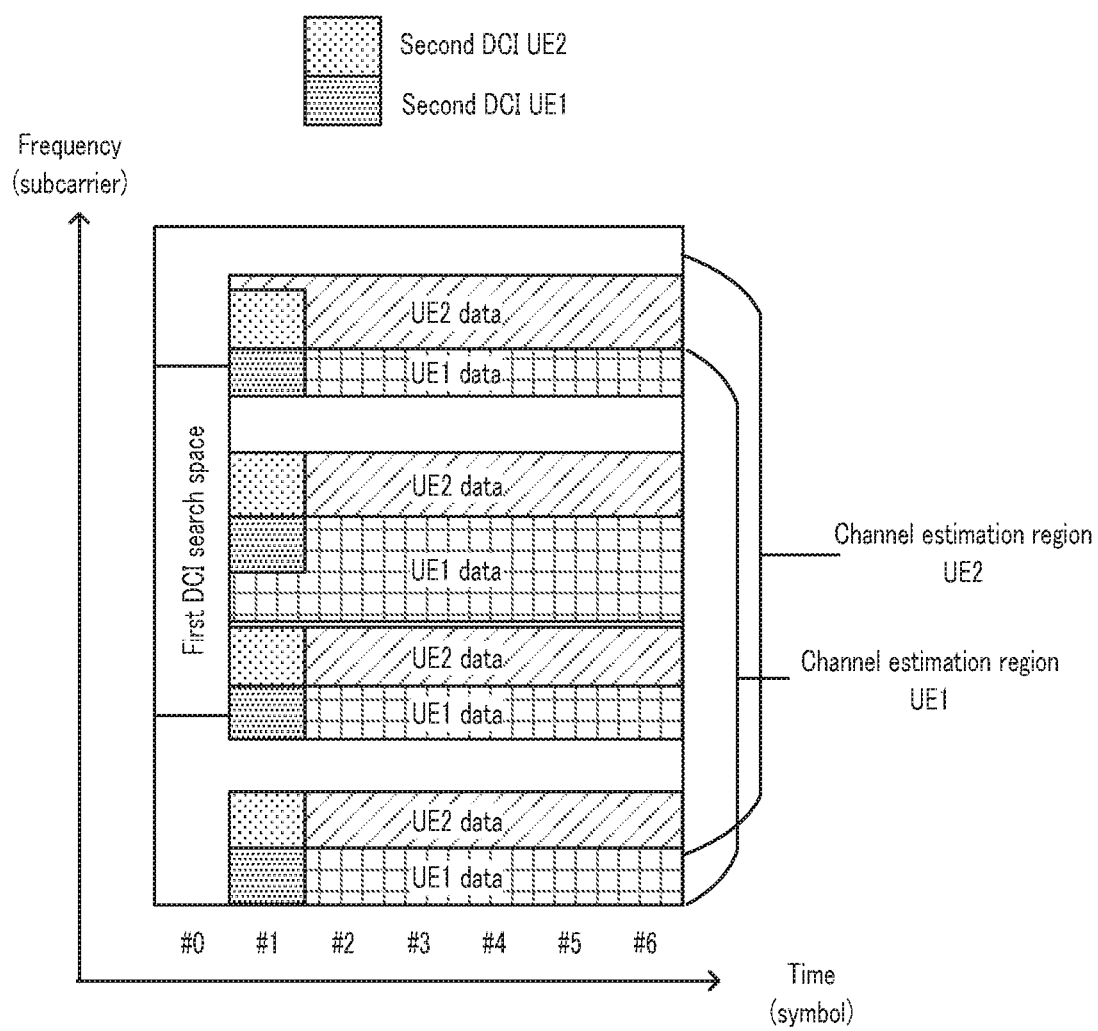
FIG. 17 is a diagram illustrating a mapping example of the second DCIs according to Embodiment 2 (Operation Example 2-4).

In Operation Example 2-4, as illustrated in FIG. 17, the second DCIs are distributedly mapped to the frequency domain for X intervals, respectively, from the start positions defined based on the channel estimation regions indicated by the first DCIs.

In FIG. 17, the start position of the region to which the second DCI is mapped is a one-side edge of the channel estimation region indicated by the first DCI, and the second DCI is split into four parts and mapped distributedly to the frequency domain. In addition, in FIG. 17, a common value is adopted between the UEs for the frequency intervals for mapping the second DCIs for each of the UEs.

In this case, base station 100 may assign data to terminal 200 in such a way that the frequency domain to which the second DCIs are mapped is contained. Moreover, when indicating the channel estimation region using the first DCI, base station 100 makes adjustment of the resource amount in data assignment with another user at a region to which no second DCI is mapped with the assumption that data is assigned to the frequency domain at an edge of the channel estimation region and the frequency domain to which the second DCI is mapped and which is determined from the interval.

Accordingly, as illustrated in FIG. 17, as a result of the adjustment of the resource amount between the UEs by base station 100, the possibility of the second DCI for terminal 200 being assigned to the outside of the range of the data region for this terminal 200 becomes low. Thus, in base station 100, it is made possible to prevent the frequency resource to which the second DCI for terminal 200 is mapped from making data assignment for another UE impossible.

Moreover, adopting a given value for the intervals has an advantage in that the possibility of collision of the second DCIs between different UEs becomes low when the start positions of the frequency domain to which the second DCIs are mapped are different between the UEs. Moreover, configuring the interval to be variable in accordance with the size of the channel estimation region such as configuring a large interval for a large channel estimation region is possible. When the interval is determined in accordance the size of the channel estimation region, the second DCIs are mapped over the entirety of the channel estimation region, so that the frequency diversity effect is even advantageously higher.

Additionally, although a description has been given herein of the case where the start position of the frequency domain to which the second DCI is mapped is an edge of the channel estimation region, this start position is not limited to this case, and a position determined from information such as a UE ID, a cell ID, a group ID and a subcell ID may be configured as the start position.

Moreover, the intervals may be configured within the channel estimation region. When the channel estimation region is not contiguous in the frequency domain, the intervals may be configured while PRBs within the channel estimation region are logically aligned. In this case, there is a possibility that the intervals are not physically constant.

Moreover, the intervals may not be constant. Intervals may be previously determined between base station 100 and terminal 200, and in accordance with the intervals, intervals for DCIs to be distributedly mapped may be determined.

The method of identifying the frequency domain for the second DCI according to Embodiment 2 has been described thus far.

As described above, according to Embodiment 2, the frequency domain to which the second DCI for terminal 200 is mapped is determined based on the information indicated by the first DCI (channel estimation region). At this time, resource allocation for data is performed such that the second DCI is mapped to the region where data (PDSCH) is mapped. Thus, base station 100 can prevent the frequency resource to which the second DCI for certain terminal 200 is mapped from making data assignment for another terminal 200 impossible. In other words, base station 100 can easily perform resource allocation in data assignment between multiple terminals 200.

Moreover, base station 100 can implicitly indicate the frequency domain for the second DCI, using the first DCI, and terminal 200 can identify the frequency domain for the second DCI, using the first DCI. Stated differently, according to Embodiment 2, the frequency domain for the second DCI can be indicated to terminal 200 without any increase in the number of information bits of the first DCI. According to Embodiment 2, terminal 200 can appropriately identify the resource to which the second DCI is mapped.

Variation of Embodiment 2

Note that, although a description has been given of the case where data is assigned to the region to which the second DCI is mapped in Embodiment 2, the data may not be assigned to the region to which the second DCI is mapped. In particular, when insertion of data of a small number of symbols such as URLLC is predicted, when a reference signal is mapped, or when another service such as MBMS is inserted, assigning no data to rearward symbols is effective when a DCI is mapped to a forward symbol.

In addition, for the frequency domain, physical mapping is illustrated as an example, logical mapping may be adopted. In case of logical mapping, change from the logical mapping to the physical mapping is made, so that, even for the frequency domain which is contiguous when FIGS. 13 to 17 are regarded as logical mapping, mapping can be performed at physically distant positions, and thus, the frequency diversity effect can be obtained.

In the embodiment described above, although the case has been described where the channel estimation region is composed of contiguous resources, the channel estimation region is not limited to this case, and the channel estimation region may be composed of non-contiguous resources.

In addition to the above, an offset for the region to which the second DCI is mapped may be determined from a parameter such as a cell ID, a sub-cell ID, a group ID, and a UE ID.

Moreover, the data to be assigned by the second DCI is received by terminal 200 when the error detection of the second DCI such as CRC succeeds. Accordingly, when reception of the second DCI fails, no data is received by terminal 200. In this respect, when data assignment is specified to contain the region for the second DCI, terminal 200 determines that no data is mapped to the region (RE) to which the second DCI is mapped. In other words, rate matching is made for the region (RE) to which the second DCI is mapped.

Moreover, an assumption can be made that the subcarrier spacing for a symbol to which the first DCI is mapped is narrow (symbol spacing is wide) and the subcarrier spacing for a symbol to which the second DCI and data symbol are mapped is wide (symbol spacing is short). In this case, terminal 200 using different subcarrier spacings for the first DCI and data transmission can receive the second DCI with subcarrier spacing wider than that of the first DCI by receiving the first DCI and recognizing the data assignment and subcarrier spacing for the data. In this case, the symbol spacing for the second DCIs can be short, so that the time required for transmitting DCIs can be reduced. Accordingly, the effect of splitting the DCI into the first and the second DCIs and reducing the overhead for the control signal becomes high.

Embodiment 3

Note that, a base station and a terminal according to Embodiment 3 have basic configurations common to base station 100 and terminal 200 according to Embodiment 1, so that a description will be given while FIGS. 3 and 4 are incorporated herein.

In Embodiment 3, a case where terminal 200 receives both of the first and the second DCIs and a case where terminal 200 receives the first DCI without receiving the second DCI are defined.

More specifically, base station 100 determines a resource for the second DCI (the presence or absence of resource allocation) based on information configured in terminal 200 or information contained in the first DCI (ST102 illustrated in FIG. 5). Meanwhile, terminal 200 determines whether the second DCI is transmitted from base station 100 or not based on the information configured in terminal 200 or the information contained in the first DCI, which is indicated by base station 100, and identifies the presence or absence of resource allocation for the second DCI (ST202 illustrated in FIG. 6).

More specifically, since base station 100 determines a DCI to be used, based on the information for terminal 200, base station 100 can perform resource allocation using the first DCI when the second DCI is unnecessary. As in Embodiment 1, the resource to which the second DCI is assigned is implicitly indicated to terminal 200 by information used for another purpose, which is contained in the first DCI. Accordingly, information for indicating the resource for the second DCI, itself, is made unnecessary, and thus, an increase in the information amount of the first DCI can be prevented.

Hereinafter, a method of identifying resource allocation for a second DCI will be described.

Operation Example 3-1

In Operation Example 3-1, the second DCI is used in a case where the resource amount to be allocated to terminal 200 is large.

The resource amount to be allocated to terminal 200 includes possible cases: (1) when the bandwidth of the carrier is wide (e.g., when the bandwidth is not less than a threshold); (2) when the UE-specific bandwidth to be monitored is wide (e.g., when the bandwidth is not less than a threshold); (3) when the channel estimation region indicated by a first DCI is wide (when the channel estimation region is not less than a threshold); and (4) when the resource amount allocated by the first DCI is large (when the resource amount is not less than a threshold), for example.

In a case where the resource amount to be allocated to terminal 200 is large, the number of bits required for indicating allocation to terminal 200 becomes large as well. Accordingly, it is effective to use the second DCI for this terminal 200. Meanwhile, in a case where the resource amount to be allocated to terminal 200 is small, it is ineffective to use the second DCI for resource allocation to terminal 200 because such use causes an increase in the overhead due to addition of CRC to both the first and the second DCIs and the ratio of the overhead for the control signal to the data amount becomes high.

Operation Example 3-2

In Operation Example 3-2, the second DCI is used in a case where the resource allocation method is significantly changed at the time of initial transmission or retransmission of HARQ.

When retransmission of HARQ is indicated, there is a possibility that a parameter used in the initial transmission is diverted in terminal 200. For example, parameters for channel estimation region, MCS, resource allocation, the number of MIMO layers, and/or the like used in the initial transmission are also used in retransmission.

As described above, when there are many pieces of information that can be diverted for retransmission, there is a possibility that the DCI length at the time of the retransmission becomes short compared with the DCI length at the time of the initial transmission. Accordingly, base station 100 can keep the overhead amount for the DCI low by using the first DCI for indication without using the second DCI at the time of retransmission.

Note that, terminal 200 can determine whether it is the initial transmission or retransmission by determining whether a new data indicator (NDI) contained in the first DCI is toggled or not.

Moreover, when resource allocation and MIMO related information is changed at the time of retransmission, and the information amount to be indicated by using the DCI is large, it is effective to use the second DCI.

Operation Example 3-3

In Operation Example 3-3, whether the second DCI is used or not is determined in accordance with a transmission mode or a transmission scheme.

For example, when a transmission mode or transmission scheme that supports multiple codewords and/or multiple layers by spatial multiplexing is configured, the second DCI may be used. Alternatively, when a transmission mode or transmission scheme that uses a large number of layers or a large number of antenna ports is configured (e.g., when the number of layers or the number of antenna ports is not less than a threshold), the second DCI may be used.

The information amount of a DCI tends to be large when the number of codewords and/or the number of layers is large. Accordingly, when the transmission mode or transmission scheme in which the information amount of the DCI becomes large is used, the second DCI is used, and when the transmission mode or transmission scheme in which the information amount of the DCI is small is used, the first DCI may be used without use of the second DCI. Note that, a parameter to be associated with the information amount of a DCI is not limited to a codeword, a layer, or an antenna port, and may be another parameter.

Note that, the transmission mode or transmission scheme can be identified by the DCI format of the first DCI. In other words, terminal 200 may determine whether the second DCI is used or not from the DCI format of the detected first DCI.

Operation Example 3-4

In Operation Example 3-4, the second DCI is used in a case where use of a narrow beam is assumed.

The case where use of a narrow beam is assumed is a case where a high bandwidth such as a bandwidth equal to or greater than 6 GHz is allocated. In this case, use of both a wide beam and a narrow beam is assumed. Moreover, when an analog beam is assumed, the beam varies for each symbol.

For example, the first DCI is mapped to a symbol transmitted using a wide beam, and the second DCI may be mapped to a rearward symbol transmitted using a narrow beam. Most of the search space for the first DCI transmitted using a wide beam is monitored by terminal 200.

When detecting the first DCI addressed to terminal 200, itself, which is transmitted using a wide beam, each terminal 200 receives the UE-specific second DCI transmitted using a narrow beam, in accordance with the detected first DCI.

Accordingly, terminal 200 does not have to monitor the first DCI for all symbols and thus can save power consumption.

Note that, terminal 200 may determine whether a narrow beam is used or not in accordance with the configured frequency band and/or in accordance with the transmission scheme.

Operation Example 3-5

In Operation Example 3-5, the second DCI is used in a case where the symbol length of DL data is long.

For example, the symbol length of DL data may be indicated by the first DCI or a control signal indicated separately from the DCI such as Physical Control Format Indicator Channel (PCFICH).

Terminal 200 determines that the second DCI is used, when the symbol length of DL data is long (when the symbol length of DL data is not less than a threshold), and determines that the first DCI is used without use of the second DCI, when the symbol length of DL data is short (when the symbol length of DL data is less than a threshold).

When the symbol length of DL data is long, it is possible to assume that the resource amount to be allocated to terminal 200 becomes large. Accordingly, it is effective to use the second DCI when the symbol length of DL data is long. Meanwhile, when the symbol length of DL data is short, it is possible to assume that the resource amount to be allocated to terminal 200 becomes small. When the resource amount to be allocated to terminal 200 is small, it is ineffective to use the second DCI for resource allocation to terminal 200 because such use causes an increase in the overhead due to addition of CRC to both the first and the second DCIs and the ratio of the overhead for the control signal to the data amount becomes high.

The method of identifying resource allocation for the second DCI has been described thus far.

As described above, according to this embodiment, base station 100 and terminal 200 determine whether the second DCI is transmitted from base station 100 to terminal 200 or not based on the information on a DL data signal, which is indicated by the first DCI (or information configured in terminal 200). More specifically, the second DCI is transmitted when the resource amount (information amount) for the DCI is large, but the second DCI is not transmitted when the resource amount for the DCI is small. More specifically, the ratio of the overhead for the DCI to the data amount is kept low in accordance with the resource amount for the DCI.

In addition, base station 100 can implicitly indicate the resource allocation for the second DCI (presence or absence of resource allocation) using the first DCI, and terminal 200 can identify the resource allocation for the second DCI using the first DCI. In other words, according to this embodiment, the resource allocation for the second DCI can be indicated to terminal 200 without any increase in the number of information bits of the first DCI. Thus, according to this embodiment, terminal 200 can appropriately identify the resource to which the second DCI is mapped.

Each embodiment of the present disclosure has been described thus far.

Note that, at least two of Embodiments 1 to 3 described above may be combined. In other words, base station 100 and terminal 200 may operate in combination of at least two of Embodiment 1 (configuration of second DCI size), Embodiment 2 (frequency domain for second DCI) and Embodiment 3 (presence or absence of second DCI).

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

A terminal according to this disclosure includes: a receiver, which in operation, receives a first downlink (DL) control signal and a second DL control signal; and circuitry, which, in operation, demultiplexes a DL data signal from a received signal, using the first DL control signal and the second DL control signal, in which the receiver identifies a resource for the second DL control signal based on information on the first DL control signal, or information on the DL data signal, indicated by the first DL control signal.

In the terminal according to this disclosure, the receiver identifies a resource size for the second DL control signal in accordance with an aggregation level of the first DL control signal.

In the terminal according to this disclosure, the receiver identifies a resource size for the second DL control signal in accordance with a modulation and coding scheme (MCS) for the DL data signal, indicated by the first DL control signal.

In the terminal according to this disclosure, the second DL control signal is mapped within a frequency domain to which the DL data signal is mapped.

In the terminal according to this disclosure, the receiver identifies a frequency domain at a center of a channel estimation region indicated by the first DL control signal, as a region to which the second DL control signal is mapped.

In the terminal according to this disclosure, the receiver identifies a frequency domain at an edge of a channel estimation region indicated by the first DL control signal, as a region to which the second DL control signal is mapped.

In the terminal according to this disclosure, the receiver identifies a frequency domain adjacent to a frequency domain to which the first DL control signal is mapped, as a region to which the second DL control signal is mapped.

In the terminal according to this disclosure, the receiver determines whether the second DL control information is transmitted or not based on information on the DL data signal, indicated by the first DL control signal.

A base station according to this disclosure includes: circuitry, which, in operation, generates a first downlink (DL) control signal and a second DL control signal; and a transmitter, which in operation, transmits the first DL control signal and the second DL control signal, and a DL data signal, in which the transmitter transmits the second DL control signal, using a resource configured based on information on the first DL control signal, or information on the DL data signal, indicated by the first DL control signal.

A communication method according to this disclosure includes: receiving a first downlink (DL) control signal and a second DL control signal; and demultiplexing a DL data signal from a received signal, using the first DL control signal and the second DL control signal, in which a resource for the second DL control signal is identified based on information on the first DL control signal, or information on the DL data signal, indicated by the first DL control signal.

A communication method according to this disclosure includes: generating a first downlink (DL) control signal and a second DL control signal; and transmitting the first DL control signal and the second DL control signal, and a DL data signal, in which the second DL control signal is transmitted, using a resource configured based on information on the first DL control signal, or information on the DL data signal, contained in the first DL control signal.

INDUSTRIAL APPLICABILITY

An aspect of this disclosure is useful in mobile communication systems.

REFERENCE SIGNS LIST

100 Base station
101 DCI generator
102, 207 Error correction encoder
103, 208 Modulator
104, 209 Signal assigner
105, 210 Transmitter
106, 201 Receiver
107, 202 Signal demultiplexer
108, 205 Demodulator
109, 206 Error correction decoder
200 Terminal
203 DCI receiver
204 Channel estimator

The invention claimed is:

1. A terminal comprising:
a receiver, which in operation, receives a first downlink (DL) control signal and a second DL control signal; and
circuitry, which, in operation, demultiplexes a DL data signal from a received signal, using the first DL control signal and the second DL control signal, wherein
the receiver identifies a resource size for the second DL control signal based on a modulation and coding scheme (MCS) for the DL data signal, indicated by the first DL control signal.

2. The terminal according to claim 1, wherein the receiver identifies the resource size for the second DL control signal in accordance with an aggregation level of the first DL control signal.

3. The terminal according to claim 1, wherein the second DL control signal is mapped within a frequency domain to which the DL data signal is mapped.

4. The terminal according to claim 1, wherein the receiver identifies a frequency domain at a center of a channel estimation region indicated by the first DL control signal, as a region to which the second DL control signal is mapped.

5. The terminal according to claim 1, wherein the receiver identifies a frequency domain at an edge of a channel estimation region indicated by the first DL control signal, as a region to which the second DL control signal is mapped.

6. The terminal according to claim 1, wherein the receiver identifies a frequency domain adjacent to a frequency domain to which the first DL control signal is mapped, as a region to which the second control signal is mapped.

7. The terminal according to claim 1, wherein the receiver determines whether the second DL control signal is transmitted or not based on information on the DL data signal, indicated by the first DL control signal.

8. A communication method comprising:
receiving a first downlink (DL) control signal and a second DL control signal; and
demultiplexing a DL data signal from a received signal, using the first DL control signal and the second DL control signal, wherein
a resource size for the second DL control signal is identified based on a modulation and coding scheme (MCS) for the DL data signal, indicated by the first DL control signal.

* * * * *